E. BRAWLEY.
DEVICE FOR MEASURING CIRCULAR BODIES.
APPLICATION FILED MAY 28, 1910.
1,020,020.
Patented Mar. 12, 1912.
3 SHEETS—SHEET 2.
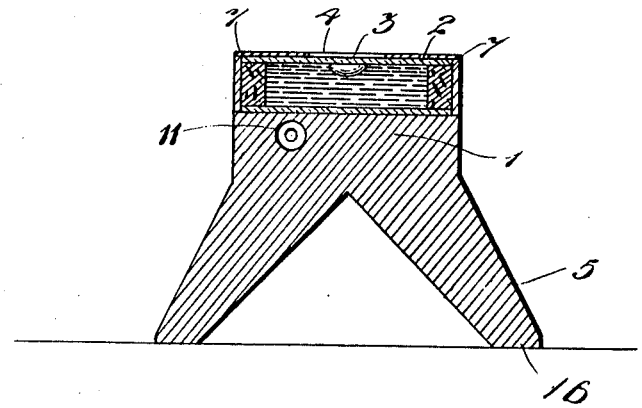
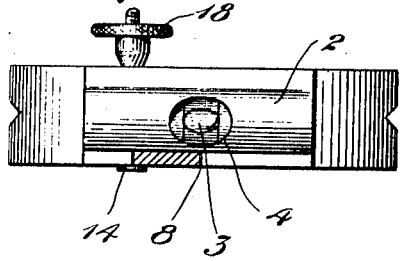
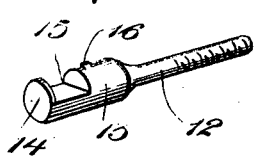
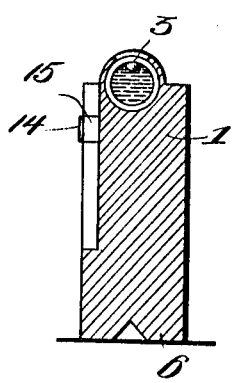
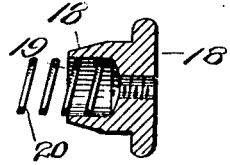
Witnesses
G. F. Tilson
L. M. Gillespie
Inventor
Ed. Brawley
Alex. J. Wedderburn, Jr.
Attorney E. BRAWLEY.
DEVICE FOR MEASURING CIRCULAR BODIES.
APPLICATION FILED MAY 28, 1910.

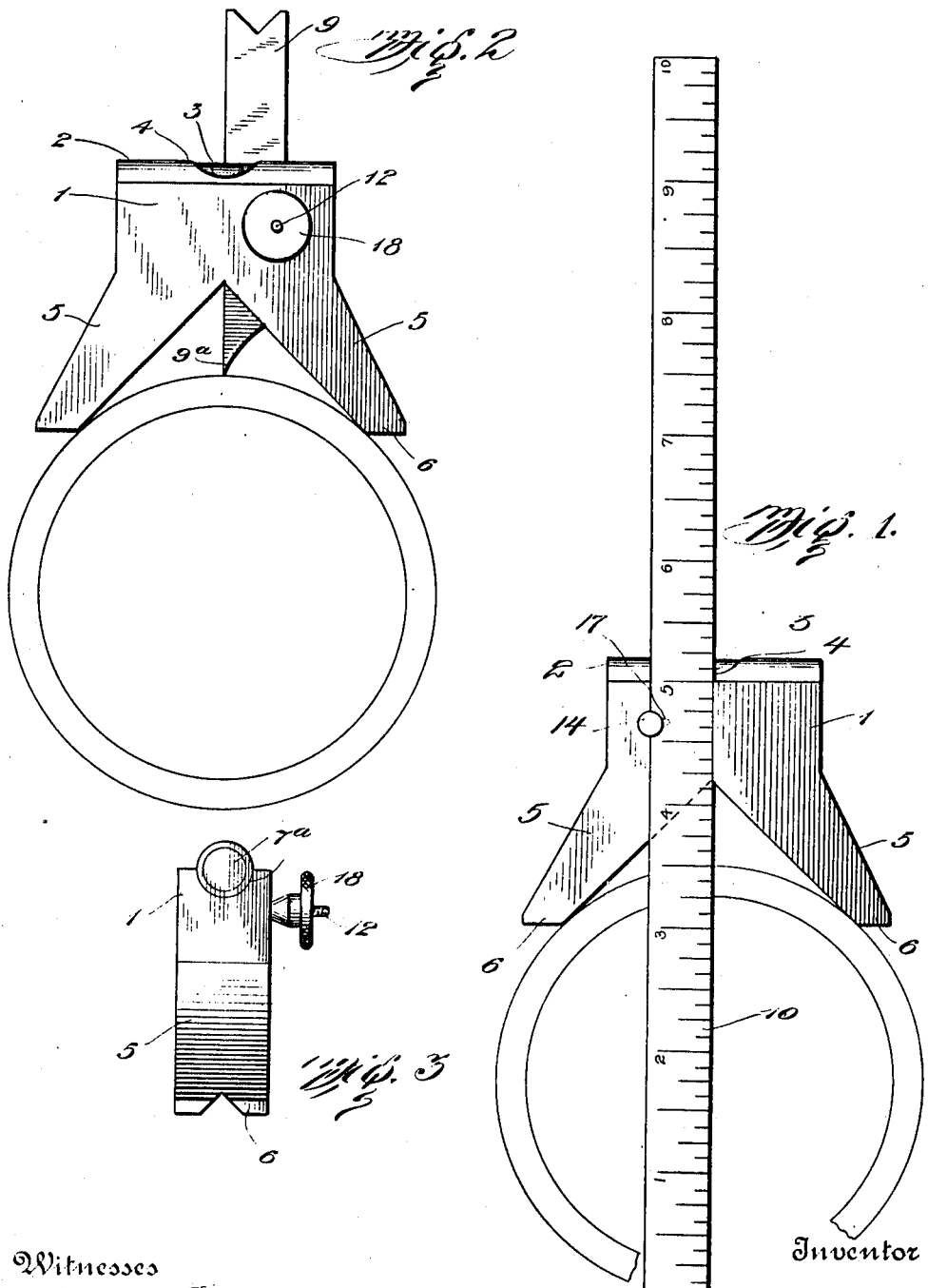

1,020,020.

Patented Mar. 12, 1912.
3 SHEETS—SHEET 3.

Witnesses

Inventor
Ed Brawley
Attorney

UNITED STATES PATENT OFFICE.

EDWARD BRAWLEY, OF BRADDOCK, PENNSYLVANIA.

DEVICE FOR MEASURING CIRCULAR BODIES.

1,020,020.

Specification of Letters Patent. Patented Mar. 12, 1912.

Application filed May 28, 1910. Serial No. 563,964.

*To all whom it may concern:*

Be it known that I, EDWARD BRAWLEY, a subject of Great Britain, residing at Braddock, in the county of Allegheny and State of Pennsylvania, have invented certain new and useful Improvements in Devices for Measuring Circular Bodies, of which the following is a specification.

This invention relates to improvements in devices for measuring circular bodies and embraces the construction of a simple device adapted to be positioned on the outer circular surface of a pipe or other circular body and a measuring tool adapted to slide on the device, whereby the diameter of the pipe or circular body may be accurately determined.

The invention is embodied in a device comprising a frame consisting of two legs united at their upper ends and formed to receive a spirit level and to slidably support a center finding tool or a measuring tool, whereby the center of a circular body or the diameter thereof may be quickly and accurately determined.

Figure 9:
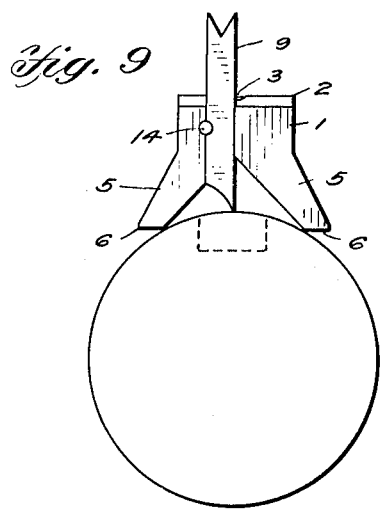
Figure 10:
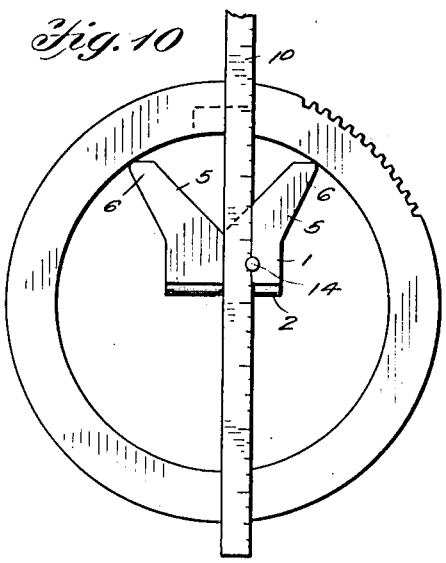
Figure 11:
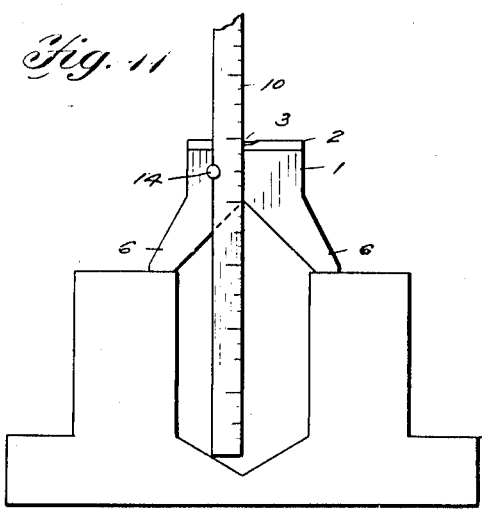
Figure 12:
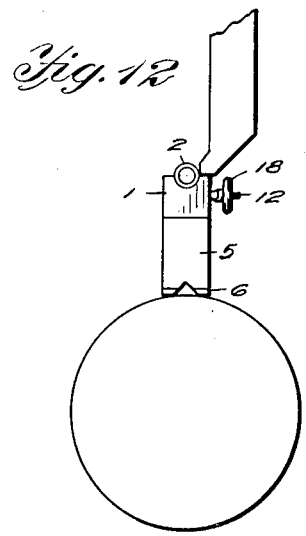

With the above and other objects in view the invention consists in certain combinations, constructions and arrangements of parts, clearly described in the following specification and clearly illustrated in the accompanying drawings, in which, Figure 1 is a side elevation showing the device applied as a pipe measuring tool, Fig. 2 is a side elevation showing the device applied as a centering tool, Fig. 3 is an end view of the device, Fig. 4 is a vertical central sectional view, Fig. 5 is a top plan view, Fig. 6 is a central sectional view of the device, Fig. 7 is a detail perspective view of a clamping screw, Fig. 8 is a detail sectional view of a nut for the clamping screw, Fig. 9 is a side elevation showing the application of the device for laying key ways, in solid shafts, Fig. 10 is a side elevation showing the application of the device for laying key ways in ring gears, Fig. 11 is a side elevation showing the application of the device as a depthometer, and Fig. 12 is a side elevation showing the application of the device for leveling planer tools and for leveling shafts.

Referring to the accompanying drawings illustrating the invention 1 denotes the upper end or part of the frame, which is provided with a shield portion 2 which holds the spirit level glass 3 in place on the frame. The portion 2 is formed with an opening 4, whereby the central part of the spirit level glass may be observed. The lower part of the frame is formed into two oppositely inclined legs 5, which are provided with peripheral engaging terminals 6. The ends of the spirit level glass are closed by corks or plugs 7. Plugs 7ᵃ hold the glass in place on the frame.

On the side of the upper part 1 of the holding frame a guide-way or groove 8 is formed, which is adapted to receive the centering tool 9 or the measuring stick 10. On one side of the groove or guide-way 8 an opening 11 extends through the upper part 1, to receive a clamping screw 12, which is provided with an enlarged end 13 having a lip 14 on its terminal to engage the outer surface of the centering tool 9 or the measuring stick 10, a recess 15 to receive the edge of said tool or said stick, and a lug 16 fitting into a recess 17 of the enlarged end of the opening 11 which receives the enlarged end 13 of the screw 12.

The screw 12 is engaged by a nut 18, which is provided with a pocket 19 for the reception of the expansion spring 20, which tends to hold the lip 14 against the outer face of the tool 9 or the stick 10 when either is placed in the groove or guide.

When the device is to be employed for finding the center of a circular body or pipe the tool 9 is employed, which tool is provided with a pointed end 9ᵃ located exactly midway of the inner edges of the peripheral engaging terminals 6 of the legs 5. The inner vertical edge of the groove or guideway 8 is located at the center of the upper part 1. When the device is employed for measuring the diameters of pipe or other circular bodies the stick 10 is employed, which stick is provided with such graduations as may be deemed desirable.

Fig. 9 illustrates the use of the device for laying key ways in solid shafts, the legs of the device being placed on the shaft and the stick or tool being used to lay the key way.

In Fig. 10 the use of the device for laying internal key ways is illustrated, the stick 10 being employed and the device being located internally of the cylinder or ring to engage the inner peripheral edge thereof. The stick 10 is placed against the end of the cylinder or ring to be key wayed, the inner edge of the stick crossing the exact center of the ring or cylinder.

Fig. 11 shows the use of the device as a depthometer, the device being shown in position on a support having a hollowed center the bottom of which is inclined. The stick 10 is used to determine the depth of the support.

In Fig. 12 the use of the device for leveling planer tools and shafts is shown. The legs of the device are placed on the shaft to be leveled and the upper end of the device is engaged by the terminal of the planer tool.

Having described my invention I claim:—

1. A measuring device consisting of a body member terminating in a pair of oppositely disposed, angularly inclined legs, said legs projecting beyond each side of said body, a spirit level seated on the upper surface and centrally of said device, said body having a vertical slot formed on one side surface thereof, one side of said slot being directly in the center of said body, on a line with the exposed center of said level and a tool vertically slidable in said slot one edge of which alines with the center of said level.

2. A measuring device consisting of a body member terminating in a pair of oppositely disposed, angularly inclined legs, said legs projecting beyond each side of said body, a spirit level seated on the upper surface and centrally of said device, said body having a vertical slot formed on one side surface thereof, one side of said slot being directly in the center of said body, on a line with the exposed center of said level, a tool vertically slidable in said slot one edge of which alines with the center of said level, and means for locking said tool in a fixed vertical position in said slot.

3. A measuring device consisting of a body member terminating in a pair of oppositely disposed, angularly inclined legs, said legs projecting beyond each side of said body, a spirit level seated on the upper surface and centrally of said device, said body having a vertical slot formed on one side surface thereof, one side of said slot being directly in the center of said body, on a line with the exposed center of said level, a tool vertically slidable in said slot one edge of which alines with the center of said level, and means for locking said tool in a fixed vertical position in said slot, said tool terminating in a point at its edge alining with said level.

In testimony whereof I affix my signature in presence of two witnesses.

EDWARD BRAWLEY.

Witnesses:
 EDMUND D. NUGENT,
 HUGH P. McMAHON.